United States Patent [19]
Fukuchi et al.

[11] Patent Number: 5,325,242
[45] Date of Patent: Jun. 28, 1994

[54] MAGNETIC RECORDING/REPRODUCING APPARATUS FOR DECREASING AN ERROR RATE IN RECORDING/REPRODUCING A DIGITAL SIGNAL

[75] Inventors: Katsumi Fukuchi, Yokohama; Yasuyoshi Nishikawa, Kawasaki; Hisashi Yamada, Yokohama, all of Japan

[73] Assignee: Kabushiki Kaisha Toshiba, Kawasaki, Japan

[21] Appl. No.: 953,816

[22] Filed: Sep. 30, 1992

[30] Foreign Application Priority Data

Sep. 30, 1991 [JP] Japan .................................. 3-278639
Jan. 6, 1992 [JP] Japan .................................. 4-000379

[51] Int. Cl.⁵ .......................... G11B 5/09; G11B 5/02
[52] U.S. Cl. .......................................... 360/46; 360/68
[58] Field of Search ................... 360/65, 43, 48, 63, 360/32, 51, 66, 68, 46, 31, 10.3, 75, 77.16, 77.17, 10.2; 358/315

[56] References Cited

U.S. PATENT DOCUMENTS

| | | | |
|---|---|---|---|
| 4,283,737 | 8/1981 | Nikami | 360/10.3 X |
| 4,326,224 | 4/1982 | Kogure et al. | 360/65 |
| 4,553,179 | 11/1985 | Inami et al. | 360/66 |
| 4,656,529 | 4/1987 | Sakamoto | 360/77.16 X |
| 4,663,555 | 5/1987 | Yoshihiro | 360/77.17 X |
| 4,713,700 | 12/1987 | Kuwahara et al. | 360/66 X |
| 5,081,547 | 1/1992 | Howell | 360/46 X |
| 5,119,194 | 6/1992 | Yamaguchi et al. | 358/166 |

FOREIGN PATENT DOCUMENTS

| | | |
|---|---|---|
| 51-150311 | 12/1976 | Japan . |
| 52-26210 | 2/1977 | Japan . |
| 55-117719 | 9/1980 | Japan . |
| 58-199410 | 11/1983 | Japan . |
| 60-217503 | 10/1985 | Japan . |
| 62-48185 | 3/1987 | Japan . |
| 4-3561 | 1/1992 | Japan . |

*Primary Examiner*—Donald Hajec
*Assistant Examiner*—Patrick Wamsley
*Attorney, Agent, or Firm*—Oblon, Spivak, McClelland, Maier & Neustadt

[57] ABSTRACT

A magnetic recording/reproducing apparatus includes a write head for recording a signal on a magnetic recording medium, a recording amplifier for supplying a recording current corresponding to the signal to the write head, a read head for reproducing the signal recorded on the magnetic recording medium, a reproducing amplifier for generating a reproduced current corresponding to the signal, an equalizer for correcting a waveform of a reproduced signal reproduced by the read head, a distortion detector for detecting distortion of signal reproduced by the read head, thereby obtaining a distortion evaluation value, and a recording current adjusting section for adjusting a magnitude of the recording current in a direction to decrease the distortion (i.e., in a direction to decrease the recording current) on the basis of a detection output obtained by the distortion detector. An optimum recording current is always supplied to the write head in accordance with the degree of wear of the write head. The degree of wear of the head is detected upon request, and head replacement is prompted.

2 Claims, 9 Drawing Sheets

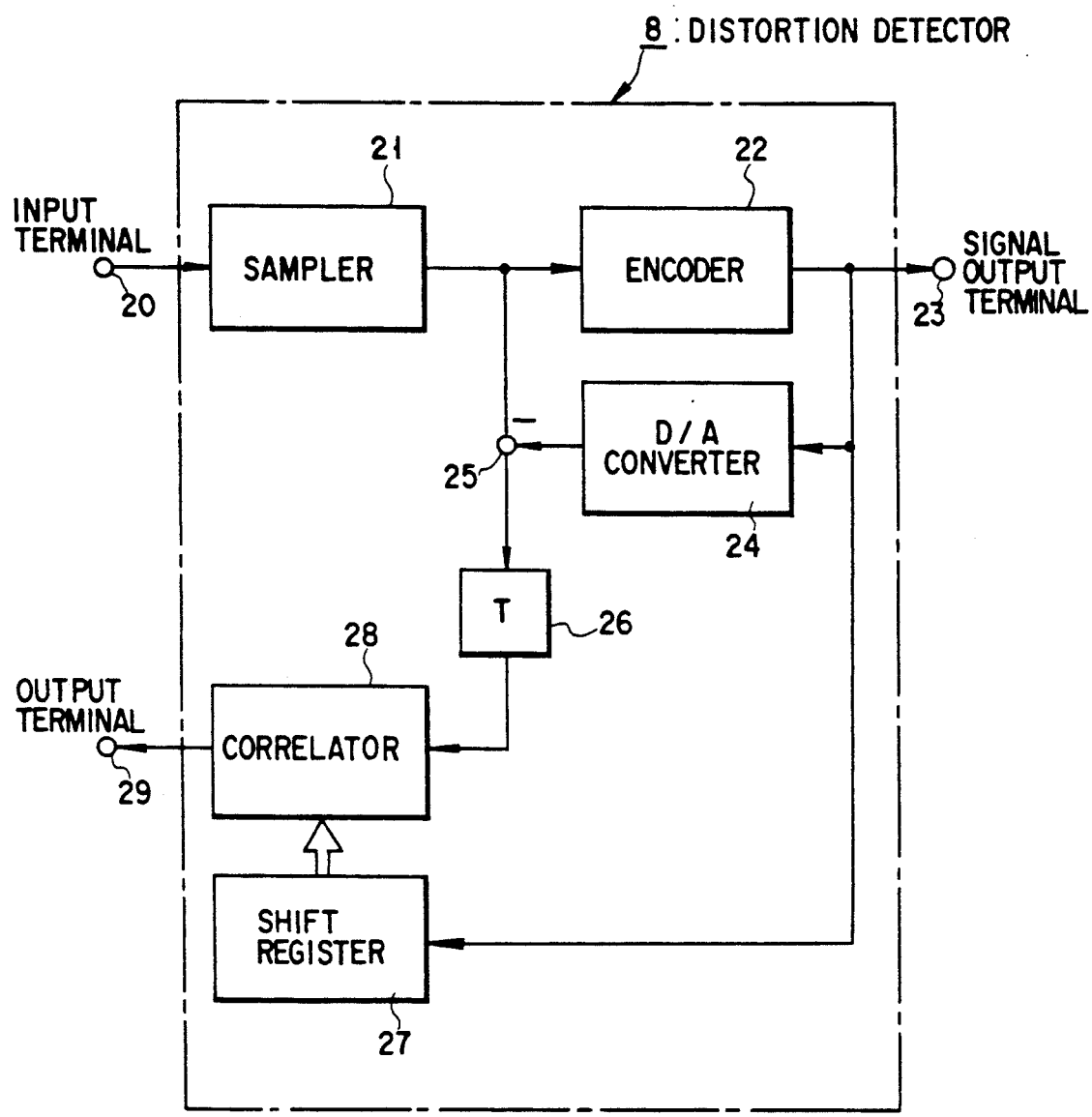
F I G. 2

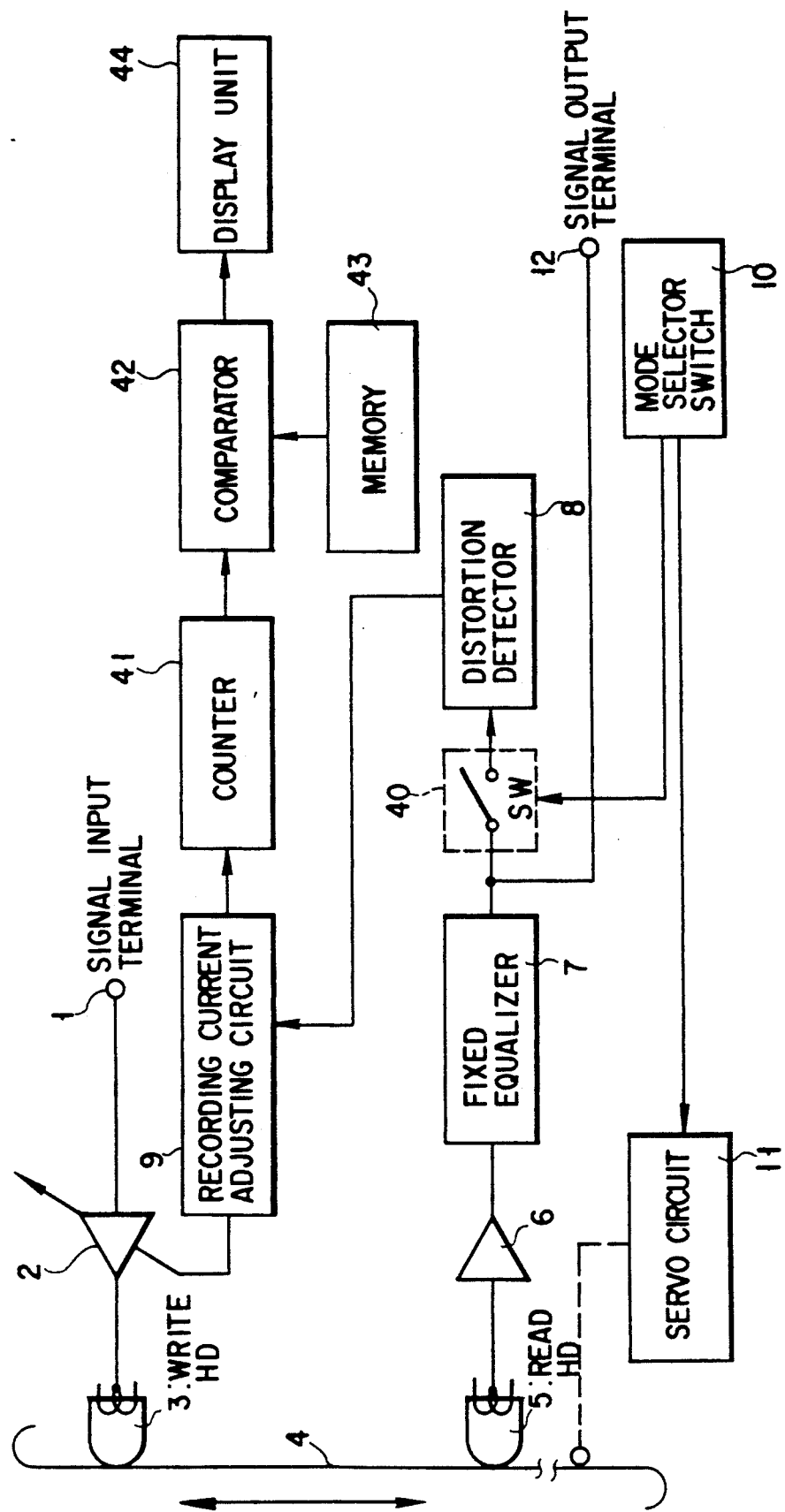
F I G. 4

MAGNETIC RECORDING/REPRODUCING APPARATUS FOR DECREASING AN ERROR RATE IN RECORDING/REPRODUCING A DIGITAL SIGNAL

BACKGROUND OF THE INVENTION

1. Field of the Invention

The present invention relates to a magnetic recording/reproducing apparatus and, more particularly, to a magnetic recording/reproducing apparatus capable of decreasing an error rate in recording and/or reproduction of a digital signal.

2. Description of the Related Art

Recently, digital VTRs for digitizing a video signal and recording/reproducing the digital video signal to obtain a high quality image are becoming popular. For broadcasting systems, digital VTRs based on the D1 and D2 formats have already been commercially available. In a digital VTR of this type, since the amount of data to be recorded is very large, head each having a small gap and a small depth are employed to increase the recording density.

Generally, a magnetic head- is gradually worn by contact with a recording medium. As a result, the depth of the gap formed in the head is gradually decreased. When the gap depth of the head is decreased, the strength of the magnetic field of the gap portion of the write head is relatively increased, and the reproduced output voltage characteristic curve shown in FIG. 10 with respect to the recording current changes from a broken curve a to a solid curve b. As a result, as the wear progresses, the value of the recording current is deviated from an optimum recording current value. At this time, the waveform of the reproduced pulse signal is changed, like from the broken curve to the solid curve, as shown in FIG. 10, and the peak of an FWHM (Full Width Half Maximum) is decreased, like the solid curve in FIG. 10,-to widen the curve in the right-and-left direction. As a result, an ISI (Inter Symbol Interference) tends to occur and increases the error rate. In order to solve this problem, wear of the head may be anticipated in advance and the recording current value may be periodically adjusted. With this method, however, the maintenance becomes cumbersome.

Generally, a reproducing system of a digital magnetic recording/reproducing apparatus, e.g., a digital VTR, has an equalizer for equalizing the waveform of a reproduced signal. The influence of the "deviation (i.e. separation)" of the recording current from the optimum value may be compensated for by using the equalizer. Equalizers of this type are classified into a fixed equalizer having fixed equalizing characteristics and a variable equalizer having equalizing characteristics which are adaptively controlled in accordance with the residual distortion of the waveform of the reproduced signal.

When a fixed equalizer is used, in order to compensate for the influence of the deviation of the recording current, the equalizing characteristics may be periodically adjusted. However, this maintenance operation is cumbersome just like the manual adjustment of the recording current described above. As a variable equalizer, an equalizer comprising linear filters, e.g., transversal filters, is well known. When such a variable equalizer is used, however, a large number of filter taps are needed in order to remove the distortion from a reproduced signal waveform, which distortion is caused by the deviation of the recording current from the optimum state, resulting in an increase in circuit size of the equalizer.

Even if the reproduced signal waveform is appropriately equalized by a fixed or variable equalizer, since the recording current value itself stays deviated from the optimum value, the S/N ratio of the reproduced signal is decreased.

When wear of the magnetic head progresses to reach a minimum allowable gap depth while the magnetic recording/reproducing apparatus is used, signal recording and reproduction failures occur. Especially, in an industrial VTR constantly requiring a high image quality, once the minimum allowable gap depth is reached, the head must be immediately replaced. Accordingly, the time of the reaching of the minimum allowable gap depth must be known in advance in order to perform head replacement at an appropriate timing. Conventionally, it is difficult to know the time a minimum allowable gap depth will be reached until wear of the head progresses to considerably degrade the image quality. Therefore, an average use time until the head reaches a minimum allowable gap depth is expediently given as the "service life of the head". The user replaces an old head with a new head when the service life of the head is estimated to have expired on the basis of the head use time.

In fact, however, the service life of the head largely depends on the environmental temperature, humidity, and the like. Sometimes the user replaces the head to avoid trouble even if the head can still be sufficiently used with a large head depth, thus wasting the head.

A conventional method of detecting a distortion in a reproduced signal is taught by, e.g., R.W. Lucky "Techniques for Adaptive Equalization of Digital Communication Systems", BSTJ, 45, 2, pp. 255-286 (1966). That is, a difference between a reproduced signal from a read head and an identified reproduced signal obtained by data-identifying the reproduced signal is defined as an error signal, and a value obtained by correlating or mutually relating the error signal and the data strings of the reproduced signal for a predetermined string length is determined as the "evaluation value of the distortion" of the reproduced signal. In this case, the positive or negative sign of the evaluated distortion value represents an increase or decrease of the distortion.

The method of manually re-adjusting the recording current value in order to remove the distortion in the reproduced signal waveform, as described above, results in cumbersome maintenance.

The method of compensating for the influence caused by wear of the head by utilizing the fixed equalizer of the reproducing system similarly requires manual adjustment of the equalizing characteristics. When a variable equalizer is used to compensate for the influence caused by wear of the head, the circuit size of the equalizer is increased.

In addition, even when either a fixed or variable equalizer is used, the recording current itself cannot be optimized, and the S/N ratio of the reproduced signal is decreased by wear of the head.

Furthermore, conventionally, the time to replace the heads cannot be precisely known by a user.

SUMMARY OF THE INVENTION

It is an object of the present invention to provide a magnetic recording/reproducing apparatus in which a recording current is automatically adjusted to an optimum value in accordance with wear of the head, and the distortion and the S/N ratio of a reproduced signal are set as close as possible to the initial state obtained before the head is worn, thereby achieving a low error rate without making an equalizer of a reproducing system complicated.

It is another object of the present invention to provide a magnetic recording/reproducing apparatus in which a wear state of a head is informed to the operator (i.e., user) in accordance with automatic adjustment of the recording current, so that the optimum head replacement time can be correctly obtained.

In order to achieve the objects described above, according to the basic features of the present invention, there is provided a magnetic recording/reproducing apparatus having a distortion .-detector for detecting distortion in a reproduced signal obtained by a read head, and a recording current adjusting section for adjusting a recording current supplied to the write head on the basis of the detection signal obtained by the distortion detector such that the distortion in the reproduced signal is decreased.

The present invention is based on the fact that when a variable equalizer is used to equalize the wave-form of a reproduced signal, a distortion component of the reproduced signal caused by wear of the head is included in an equalization error detection signal obtained by an equalization error detector used for controlling the equalization characteristics of the variable equalizer. Control over the equalization characteristics of the variable equalizer based on the equalization error detection signal is that suspended, and the characteristics of the variable equalizer are fixed. Then, the recording current is adjusted to decrease the equalization error on the basis of the equalization error detection signal.

Furthermore, according to the present invention, there is provided a magnetic recording/reproducing apparatus further comprising a detector for detecting an adjustment amount of the recording current adjusted by the recording current adjusting section, a comparator for comparing the adjustment amount of the recording current detected by the detector with a preset threshold value, and a display unit for displaying a comparison result of the comparator, thereby monitoring wear of the head.

When a fixed equalizer is used to equalize the waveform of a reproduced signal, the equalization characteristics are constant as they are set to the initial state. Thus, if residual distortion appears in a reproduced signal that cannot be removed by the equalizer, the write head is supposed to be worn compared to the initial state.

In use of the variable equalizer, when the adaptive operation of the variable equalizer is temporarily stopped and the equalization characteristics of the equalizer are reset to the initial state, if a distortion appears in a reproduced signal that cannot be removed by the equalizer, the write head is supposed to be worn compared to the initial state. In other words, generally, it is supposed that most of the reproduced signal distortion components which appear when the equalization characteristics of the equalizer are reset to the state prior to the worn-out state of the head are caused because the strength of the magnetic field formed by the write head with respect to a predetermined recording current is changed by wear of the head.

Therefore, when the fixed equalizer is used, the recording current is adjusted on the basis of the distortion detection signal of the reproduced signal to reset the strength of the magnetic field formed by the write head to the initial state, so that at least the distortion caused by wear of the head is removed to restore the waveform of a reproduced signal of the initial state free from the distortion. When the variable equalizer is used, its adaptive operation, i.e., control over the equalization characteristics by the equalization error detection signal is stopped, and the equalization characteristics of the variable equalizer are reset to the initial state so that the distortion in a reproduced signal can be controlled only by the recording current. Then, the distortion in the reproduced signal can be detected from the equalization error detection signal. When the recording current is adjusted on the basis of the distortion to reset the strength of the magnetic field formed by the write head to the initial state, the waveform of the reproduced signal of the initial state from which the distortion caused by wear of the head is moved can be restored. When the recording current is adjusted in this manner, the FWHM spread of the waveform of the reproduced signal is suppressed to decrease ISI and to improve the S/N ratio of the reproduced signal, thereby minimizing the error rate.

In this manner, according to the present invention, the distortion in a reproduced signal caused by wear of the head is suppressed by adjusting the recording current. Hence, if the fixed equalizer is used, a cumbersome operation of manually adjusting the equalization characteristics is not required, and the degree of suppression of the equalization error in the initial state can be moderated, so that the configuration of the equalizer is simplified. If the variable equalizer is used, the equalization range, i.e., the range of the corresponding distortion need not be wide, thus simplifying the circuit configuration of the equalizer. For example, in a transversal filter type variable equalizer, the number of taps necessary to suppress the error rate to a predetermined value can be decreased.

In addition, the present invention is based on the fact that when a recording current is adjusted in the manner as described above, the adjustment amount of recording current depends on the wear state of the head. This adjustment amount is compared with a threshold, and a comparison result is displayed. For example, when the adjustment amount exceeds the threshold value, it is informed to the operator that the gap of the head is close to a minimum allowable gap depth. Therefore, the head can be used until immediately before the gap reaches a depth end, substantially prolonging the service life of the head. The head replacement time is correctly informed to the operator well in advance to facilitate preparation for the maintenance operation. As the threshold to be compared with the adjustment amount of recording current, the deviation amount from the optimum recording current which corresponds to wear of the head to be detected may be used.

Additional objects and advantages of the invention will be set forth in the description which follows, and in part will be obvious from the description, or may be learned by practice of the invention. The objects and advantages of the invention may be realized and obtained by means of the and structural combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing an arrangement of a distortion detector of FIG. 1;

FIG. 4 is a block diagram showing a magnetic recording/reproducing apparatus according to the third embodiment of the present invention;

DETAILED DESCRIPTION OF THE PREFERRED EMBODIMENTS

First Embodiment

Figure 1:
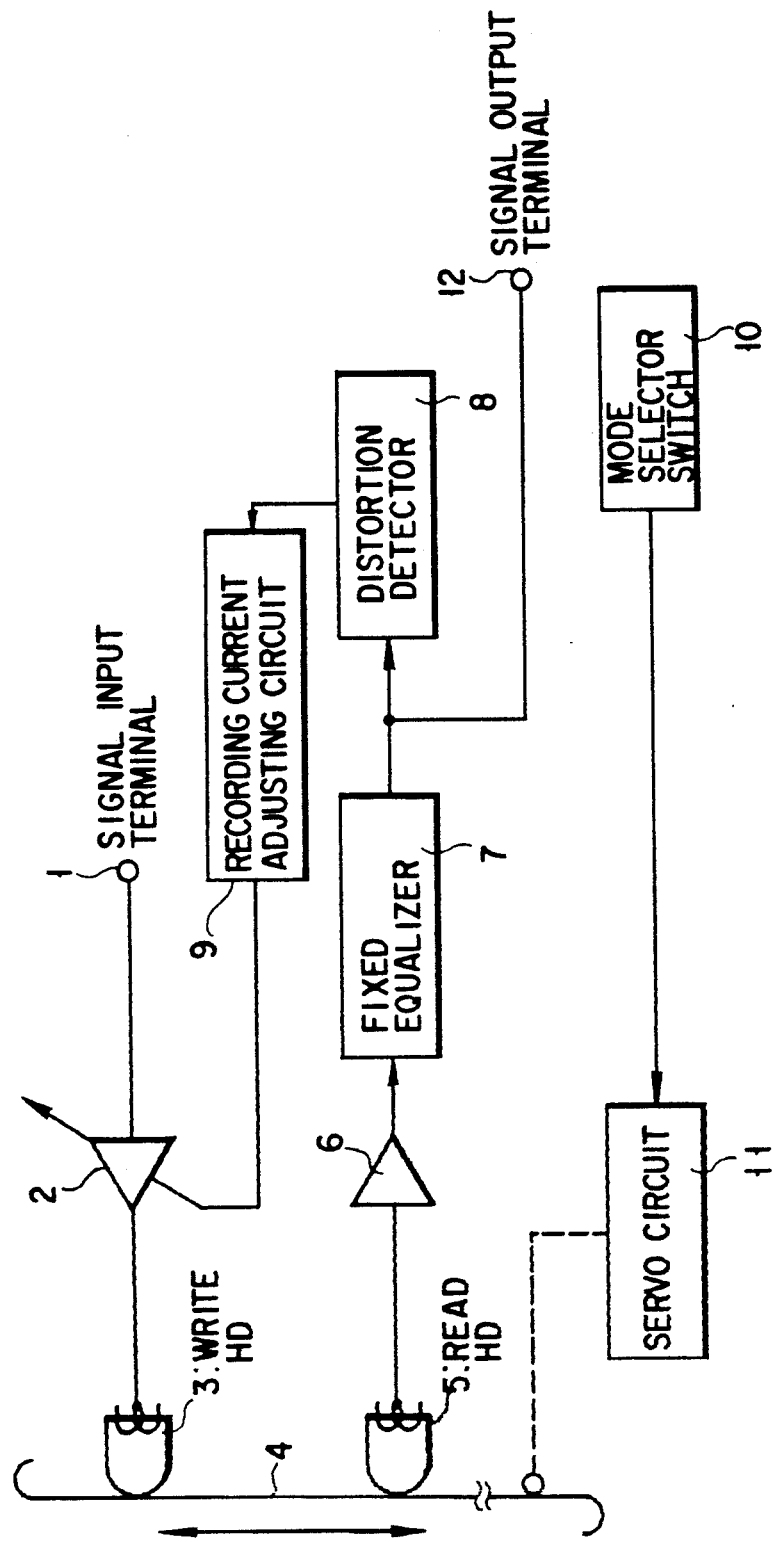
FIG. 1 is a block diagram showing a magnetic recording/reproducing apparatus according to the first embodiment of the present invention.

FIG. 1 shows an arrangement of a portion of a magnetic recording/reproducing apparatus according to the first embodiment of the present invention. This apparatus exemplifies the present invention as a digital VTR.

Referring to FIG. 1, a data signal, e.g., a video signal input from a signal input terminal 1 is amplified by a recording amplifier 2. The recording amplifier 2 supplies a recording current corresponding to the input signal to a write head 3. The write head 3 is mounted on the circumferential surface of a rotary drum to write and record a desired signal on a magnetic recording medium (e.g. tape) 4 which travels as it is wound on the rotary drum. The recorded signal is reproduced by a read head 5 similarly mounted on the circumferential surface of the rotary drum and amplified by a preamplifier 6 connected to the read head 5.

A reproduced signal output from the preamplifier 6 is guided to a signal output terminal 12 through a fixed equalizer 7 connected to the preamplifier 6, and is also input to a distortion detector 8 connected to the fixed equalizer 7. The distortion detector 8 detects distortion in the output signal from the fixed equalizer 7. The detection signal output from the distortion detector 8 is supplied to a recording current adjusting circuit 9 connected to the distortion detector 8. The recording current adjusting circuit 9 adjusts the recording current to be output from the recording amplifier 2 on the basis of the detection signal from the distortion detector 8 such that the distortion becomes minimum (more specifically, it adjusts the recording current in a current decreasing direction).

A mode selector switch 10 switches the apparatus between the normal operation mode and the recording current adjustment mode. A predetermined command is supplied to a servo circuit 11 for controlling the rotational speed of the capstan motor of the VTR and the like through the mode selector switch 10.

The recording current adjustment operation of this embodiment will be described.

Assume that wear of the write head 3 is in progress since the VTR repeats recording and reproduction for a long period of time, and that a certain degree of distortion appears in the reproduced signal output from the preamplifier 6. In this case, the apparatus is automatically switched to the recording current adjustment mode by the mode selector switch 10 at, e.g., every start of recording. In the recording current adjustment mode, the servo circuit 11 is interlocked with the mode selector switch 10 to stop travel of the magnetic recording medium 4, and the VTR is set to the "still" state. In this state, so-called "simultaneous reproduction" is performed. The recording current is adjusted to an optimum value while "recording/reproduction/delete" operations are repeated in every revolution of the rotary drum.

More specifically, in the first embodiment, distortion in the reproduced signal output through the fixed equalizer 7 is detected by the distortion detector 8, and the recording current to be flowed to the recording amplifier 2 is adjusted by the recording current adjusting circuit 9 in accordance with the detection signal output from the distortion detector 8. That is, the recording current is temporarily caused to fluctuate in either the "increasing" or "decreasing" direction. If the distortion is decreased, the recording current is caused to continue fluctuating in the same direction. If the distortion is increased, the recording current is caused to fluctuate in the opposite direction. The magnitude of the recording current is repeatedly adjusted until the distortion is decreased to be equal to or smaller than a certain threshold value. As the result of this adjustment, a reproduced signal output having a minimum distortion caused by wear of the head is finally obtained at the signal output terminal 12. In this case, the degree of suppressing the equalization error by the fixed equalizer 7 in the initial state can be moderated.

An additional description will be made. In the present invention, distortion in a reproduced signal waveform used as the evaluation reference for adjusting the recording current is mainly caused by the "deviation" from the optimum recording current caused by wear of the write head. Accordingly, the wear that can be detected by the apparatus of the present invention is limited to that of the write head. In other words, the degree of wear of the read head cannot be detected. However, the present invention suffices with this limitation due to the following reason. Usually, in a VTR, to perform head replacement due to wear, both write and read heads are replaced at once as they are mounted on the same drum. Regarding the material, if head combination is such that a write head wears faster than a read head (e.g., ferrite is employed as the material of the core of the read head and Sendust softer than ferrite is employed as the material of the write head), the operator can know the time of head replacement before a degradation in a reproduced image due to wear of the read head occurs. Thus, this combination is particularly effective. Also, generally the service life of a write head is designed to be almost the same as that of a corresponding read head. Thus, according to the scheme of the present invention for detecting wear of only the write head, the degree of wear of the read head can be determined to be similar to that of the detected wear of the write head. Therefore, a head having a normal wear state and a sufficient remaining service life will not be wastefully replaced, and no problem arises in practice.

A practical arrangement of the distortion detector 8 of FIG. 1 will be described with reference to FIG. 2. Distortion in a reproduced signal may be detected in a manner as described in "Description of the Related Art". In the present invention, it is detected in a manner as follows. FIG. 2 shows an arrangement of the distortion detector 8 capable of obtaining the distortion evaluation value as described above. Referring to FIG. 2, an output signal from the fixed equalizer 7 in FIG. 1 is input to an input terminal 20. The waveform of this signal is periodically sampled by a sampler 21 to obtain a sample value of the reproduced signal. The sample value of the reproduced signal is converted to a code signal by an encoder 22. A code signal output from the encoder 22 is converted again to an analog signal by a local D/A converter 24 and supplied to a subtracter 25 as a reference signal. The subtracter 25 obtains a difference between the reference signal from the D/A converter 24 and the sample value of the reproduced signal from the sampler 21 and outputs an error signal. The error signal is supplied to one input of a correlator 28 through a delay circuit 26. The other input of the correlator 28 receives the code signal from the encoder 22 through a shift register 27. The correlator 28 calculates the mutual correlation between the two input signals. The result of the mutual correlation is the maximum likelihood estimation value of the distortion of the reproduced signal having a certain reference voltage as the center, and represents an increase or decrease in distortion The output signal from the correlator 28 is output from an output terminal 29 as a distortion detection signal and supplied to the recording current adjusting circuit 9 of FIG. 1.

In the recording/reproducing head assembly described above, the writehead 3 and the read head 5 are separately provided. Their materials are not particularly limited. That is, the write and read heads 3 and 5 can be made of different materials or of the same material. For example, the write head 3 may be a TTS (Tilted Sendust Head), and the read head 5 may be a ferrite head. With this combination, the write head 3 wears more easily than the read head 5.

Second Embodiment

Figure 3:
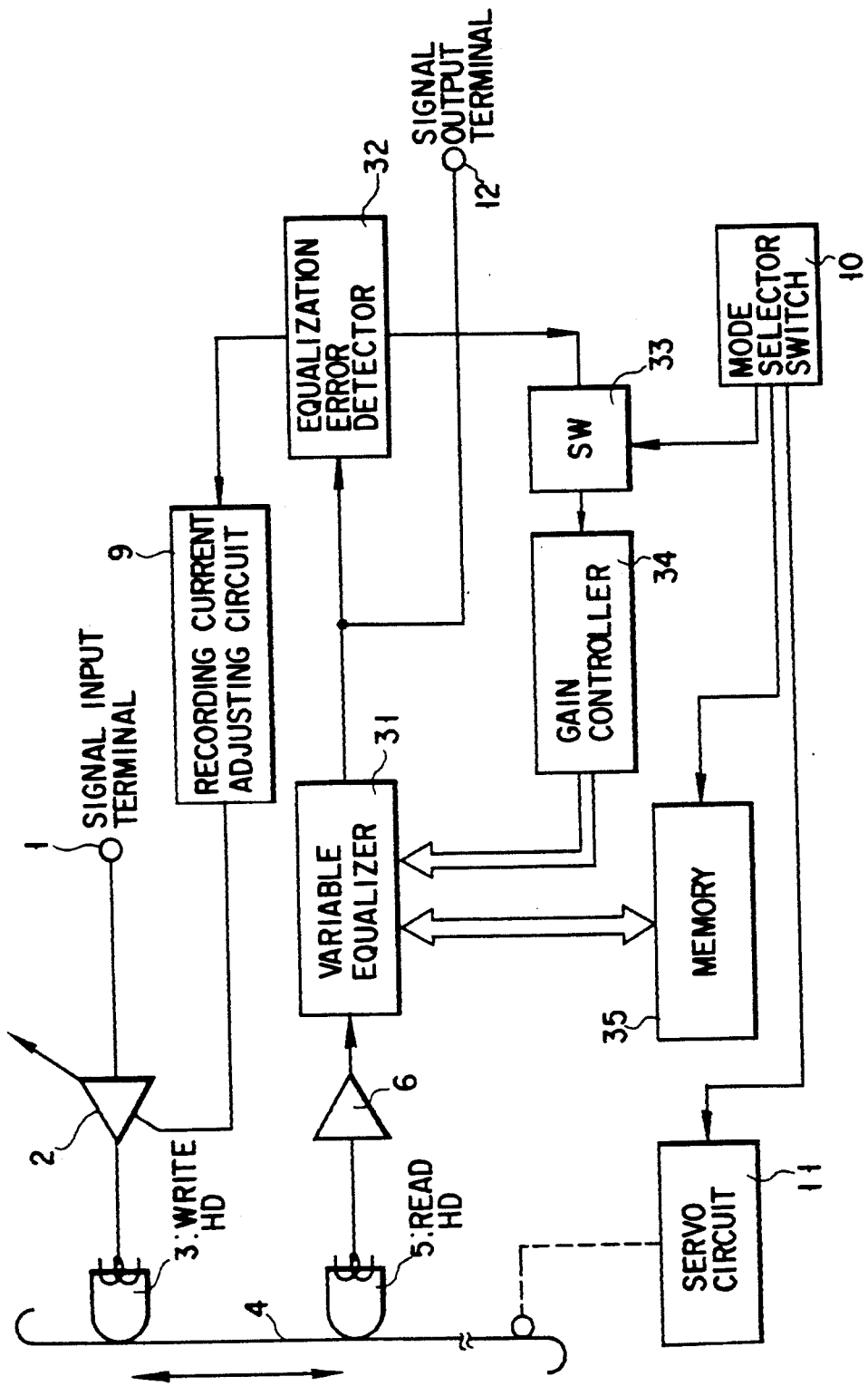
FIG. 3 is a block diagram showing a magnetic recording/reproducing apparatus according to the second embodiment of the present invention.

FIG. 3 is a block diagram showing the second embodiment of the present invention. In this embodiment, a variable equalizer 31 is used to equalize the equalizer of the reproduced signal. An output from the variable equalizer 31 is guided to the signal output terminal 12 and simultaneously input to an equalization error detector 32. The equalization error detector 32 obtains the "equalization error (i.e., distortion data on the output from the variable equalizer 31)" of the variable equalizer 31. An output from the equalization error detector 32 is supplied to the variable equalizer 31 as a control signal through a switching circuit 33 and a gain controller 34, and equalization characteristics of the variable equalizer 31 are controlled.

The second embodiment is based on the fact that the distortion component of the reproduced signal caused by wear of a write head 3 is included in the equalization error detection signal as an output from the equalization error detector 32. More specifically, control over the equalization characteristics of the variable equalizer 31 based on the equalization error detection signal is temporarily stopped and the characteristics of the variable equalize 31 are fixed to the initial state. Then, the recording current to be supplied from a recording amplifier 2 to the write head 3 is adjusted by a recording current adjusting circuit 9 to an optimum level. For this purpose, the second embodiment shown in FIG. 3 has a memory 35 for storing the initial sate of the "equalization characteristics" of the variable equalizer 31.

The operation of adjusting the recording current of the second embodiment will be described.

The apparatus is automatically switched to the "recording current adjustment mode" by a mode selector switch 10 at, e.g., every start of recording. In the "recording current adjustment mode", a servo circuit 11 is interlocked with the mode selector switch 10 to set the VTR in the "still" state. In this state, so-called "simultaneous reproduction" is performed. The recording current is adjusted while recording/reproduction/delete operations are repeated every revolution of the rotary drum.

In this case, the switching circuit 33 between the equalization error detector 32 and the gain controller 34 is interlocked with the mode selector switch 10 to be turned off, and the adaptive operation of the variable equalizer 31 is temporarily stopped. The equalization characteristics of the variable equalizer 31 are reset to the initial state (i.e., the state before the write head 3 wears) stored in the memory 35 in advance, so that distortion in the reproduced signal can be controlled only by the magnitude of the recording current.

At this time, the equalization error detection signal detected by the equalization error detector 32 indicates an increase or decrease in distortion of the reproduced signal. When the equalization error detection signal is input to the recording current adjusting circuit 9, if the equalization error detection signal input from the equalization error detector 32 is data indicating an "increase in distortion", the recording current adjusting circuit 9 switches the adjusting direction of the recording current in the opposite direction. Inversely, if the equalization error detection signal indicates a "decrease in distortion", the recording current adjusting circuit 9 does not switch the adjusting direction of the recording current but holds it.

When the recording current adjustment operation as described above is repeatedly performed, distortion in the reproduced signal caused by wear of the head can be suppressed as much as possible. As a result, since the variable equalizer 31 need to remove only small distortion that cannot be removed by adjusting only the recording current, it need not have a wide "equalization range (i.e., the range of distortion to be dealt with)", thereby simplifying the circuit configuration.

Third Embodiment

The block diagram in FIG. 4 shows the third embodiment of the present invention. In the third embodiment, in addition to the constituent elements of the first embodiment shown in FIG. 1, a switching circuit 40, a counter 41, a comparator 42, a memory 43, and a display unit 44 are provided.

The switching circuit 40 is interlocked with a mode selector switch 10 to be connected in the "recording current adjustment mode (i.e. head wear detection mode)" at recording start. Then, a reproduced signal output through a fixed equalizer 7 connected to the switching circuit 40 is also input to a distortion detector 8, and the degree of distortion to be obtained is detected. The recording current is appropriately adjusted by a recording current adjusting circuit 9 in accordance with the detection signal output from the distortion detector 8 in the same manner as in the second embodiment.

In the third embodiment, the adjustment amount of the recording current by the recording current adjusting circuit 9 is measured by the counter 41, and the measurement result and a threshold value stored in the memory 43 in advance are compared by the comparator 42. A value corresponding to the deviation amount from the optimum recording current when wear of the head to be detected occurs is employed as the threshold value stored in the memory 43. When it is determined by the comparator 42 that the recording current adjustment amount exceeds the threshold value, the display unit 44 displays a message indicating that the head is worn to prompt the operator to perform head replacement.

Figure 5:
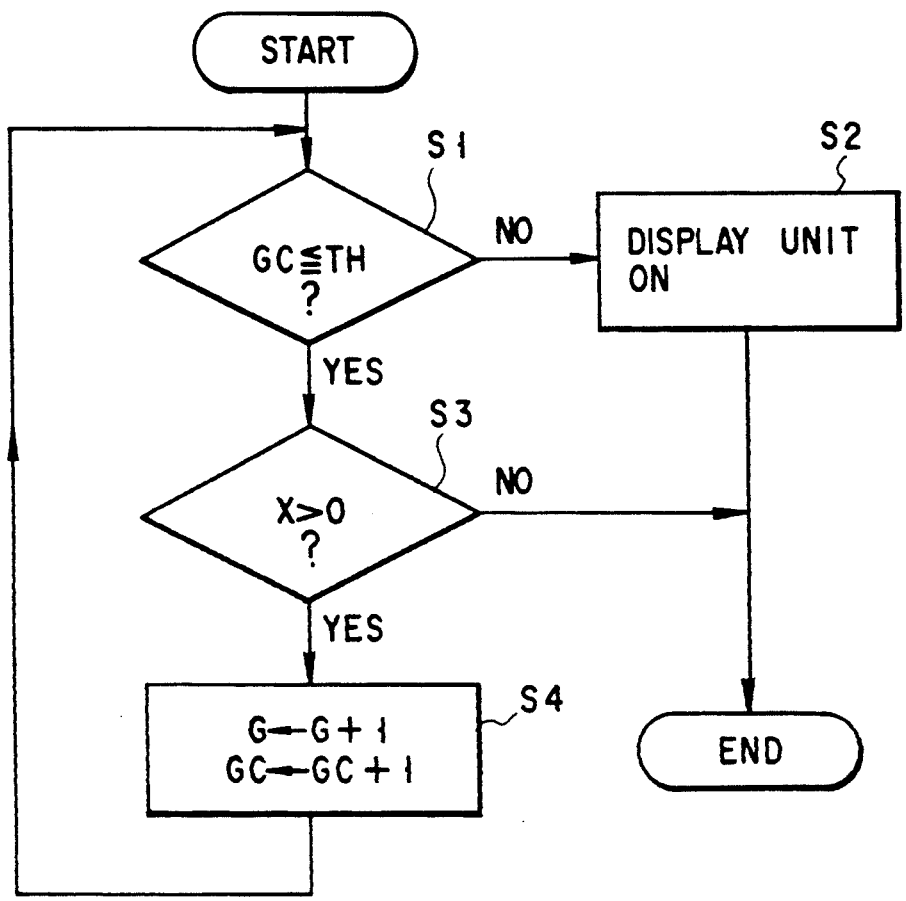
FIG. 5 is a flow chart for explaining the operation of the third embodiment.

This operation will be described in more detail with reference to the operation flow chart of FIG. 5. When the apparatus is set in the recording current adjustment mode by the mode selector switch 10, a gain variable GC output from the counter 41 and a threshold value (e.g. gain threshold value) TH stored in the memory 43 are compared by the comparator 42 (step S1). Note that the gain variable GC is a variable that increases or decreases in accordance with an increase or decrease in gain G of a recording amplifier 2 set by the recording current adjusting circuit 9, and can be obtained by counting a pulse output from the recording current adjusting circuit 9 every time the gain G is increased or decreased by one step.

If the comparison result in step S1 is GC>TH (N in step S1), that is, if the gain variable GC exceeds the threshold value TH, the display unit 44 is turned on (e.g., lit) to display a message indicating that the head is worn (step S2). If GC s TH (Y in step S1), it is checked by the recording current adjusting circuit 9 whether a distortion detection signal output X (cf. X= +1 when the distortion is increased; X= −1 when the distortion is decreased) from the distortion detector 8 satisfies X>0 (step S3). If Y in step S3, that is, if the distortion is increased, the gain G supplied to the recording amplifier 2 from the recording current adjusting circuit 9 is incremented by 1 step, and the gain variable GC output from the counter 41 is incremented by 1 step (step S4).

The operations of steps S1 to S4 are repeated in the same manner until the recording current adjustment mode is canceled by the mode selector switch 10.

Fourth Embodiment

Figure 6:
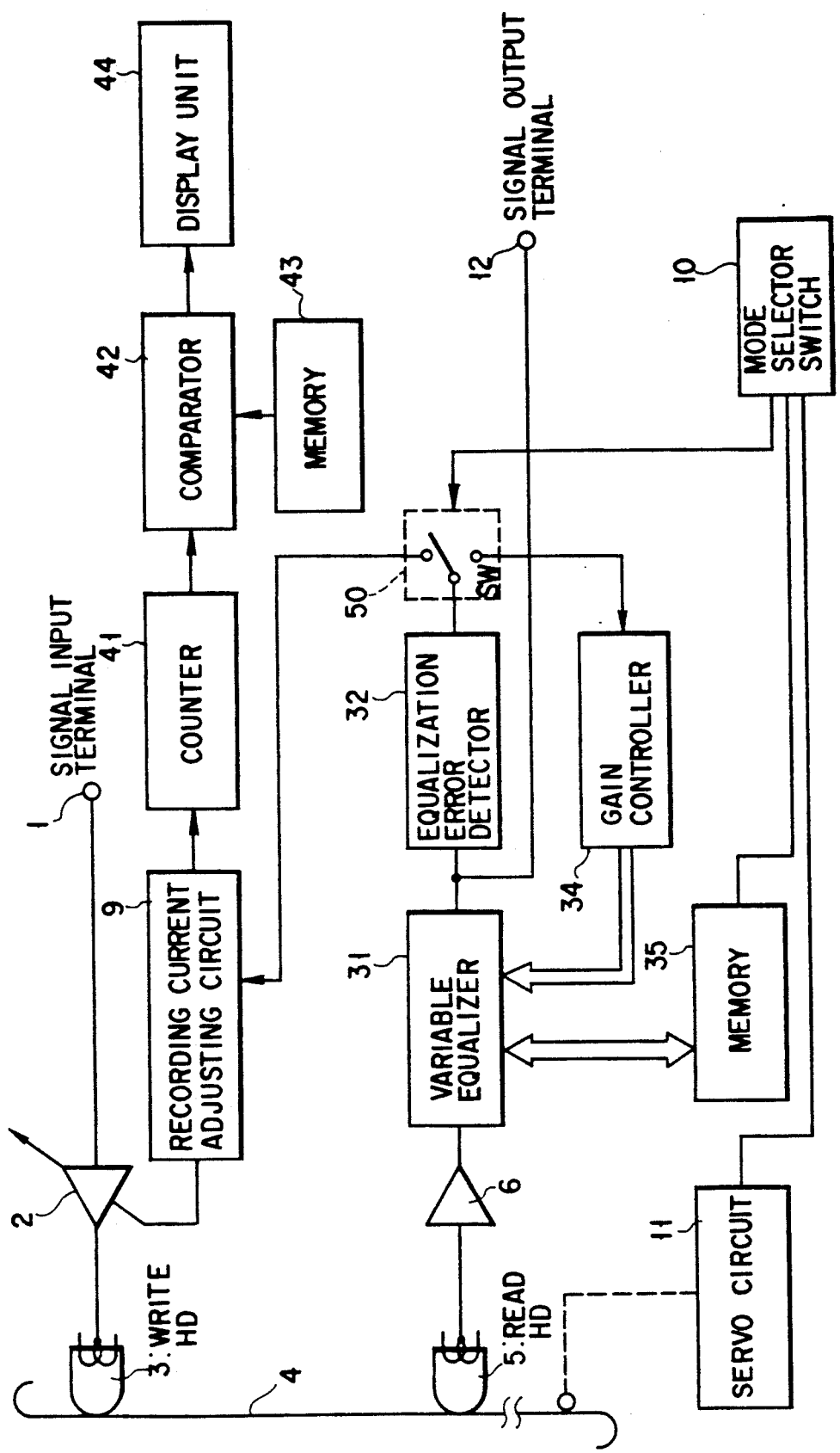
FIG. 6 is a block diagram showing a magnetic recording/reproducing apparatus according to the fourth embodiment of the present invention.

The block diagram in FIG. 6 shows the fourth embodiment of the present invention. In the fourth embodiment, in addition to the constituent elements of the second embodiment shown in FIG. 3, a switching circuit 50, a counter 41, a comparator 42, a memory 43, and a display unit 44 are provided. More specifically, the switching circuit 50 is interlocked with a mode selector switch 10 to be switched to the upper side in FIG. 6 in the recording current adjustment mode (cf. head wear detection mode) at the start of recording. Then, a recording current adjusting circuit 9 adjusts the recording current on the basis of an equalization error signal detected by an equalization error detector 32.

The "adjustment amount" of the recording current by the recording current adjusting circuit 9 is measured by the counter 41 in the same manner as in the third embodiment shown in FIG. 4, and the measurement result and the threshold value stored in the memory 43 in advance are compared by the comparator 42. A value corresponding to the "deviation amount" from the optimum recording current when wear of the head to be detected occurs is employed as the threshold value stored in the memory 43. When it is determined by the comparator 42 that the recording current adjustment amount exceeds the threshold value, the display unit 44 displays a message indicating that the head is worn to prompt the operator to perform head replacement. This operation is performed in accordance with the sequence of the flow chart of FIG. 5. When the recording current adjustment mode is canceled by the mode selector switch 10, the switching circuit 50 is switched to the lower side in FIG. 6, and an output from the equalization error detector 32 is input to a gain controller 34. In response to this input, the adaptive operation for a variable equalizer 3 by the gain controller 34 is started.

Fifth Embodiment

Figure 7:
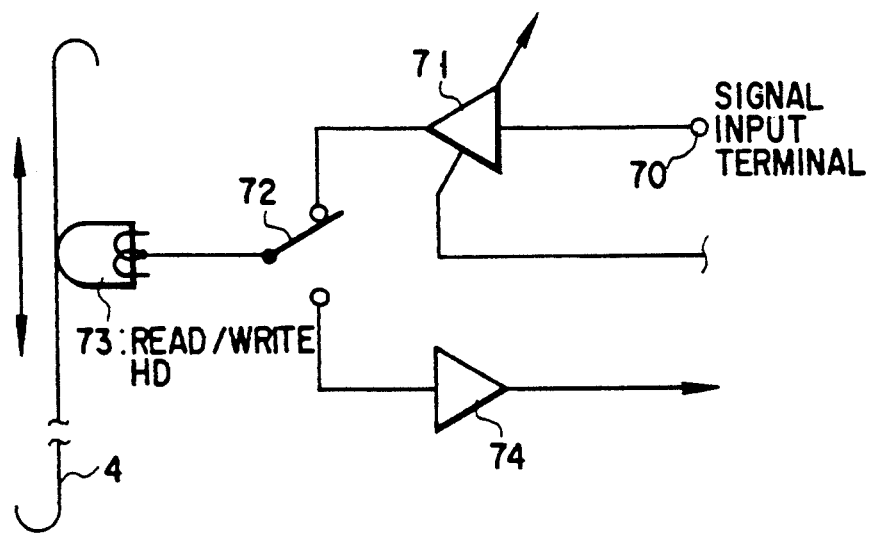
FIG. 7 is a block diagram showing a magnetic recording/reproducing apparatus according to the fifth embodiment of the present invention.
Figure 10:
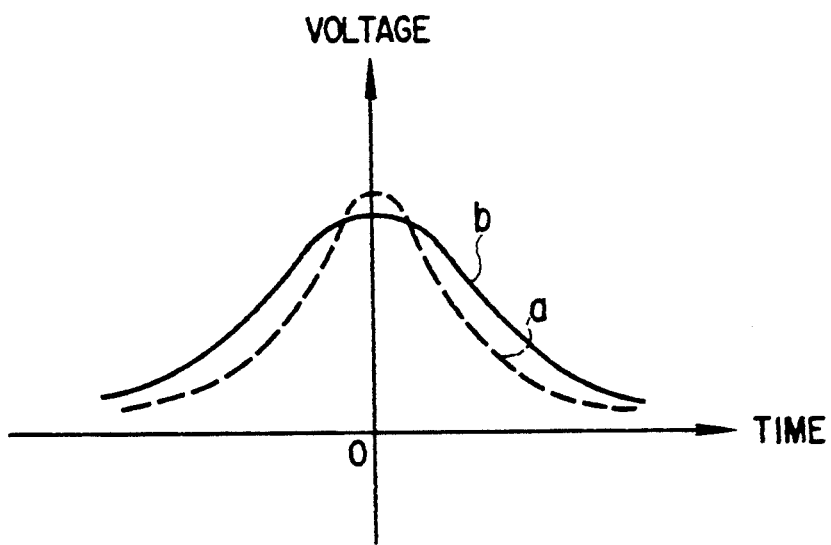
FIG. 10 is a graph showing a degradation in waveform of a reproduced signal of a conventional magnetic recording/reproducing apparatus.

FIG. 7 shows only the main part of the fifth embodiment of the present invention. In each of the first to fourth embodiments described above, one write head 3 and one read head 5 are provided separately. However, in the fifth embodiment, a single head 73 performing both write/read operations is employed. Switching between a recording amplifier 71 and a reproducing preamplifier 74 is performed by a switching circuit 72 so that they are selectively appropriately connected to the head 73.

In the fifth embodiment as well, the apparatus is automatically set to the "recording current adjustment mode" by a mode selector switch 10 at every start of recording. In the recording current adjustment mode, adjustment of the recording current is performed in the same manner as in the first to fourth embodiments described above while repeating recording and switching-/reproduction/delete operations of the amplifier 71 or 74 selected by the switching circuit 72 in every revolution of the drum.

As has been described above, according to the present invention, distortion in a reproduced signal caused by wear of the head can be suppressed as much as possible by automatically adjusting the recording current. As a result, when the fixed equalizer 7 is used to "equalize" the reproduced signal, a cumbersome operation of manually adjusting the equalization characteristics to compensate for the influence of wear of the head becomes unnecessary, the degree of suppression of the equalization error in the initial state can be moderated, and the arrangement of the equalizer can be simplified.

When the variable equalizer 31 is used to "equalize" the reproduced signal, the equalization range (i.e., the range of corresponding distortion) need not be wide to compensate for the influence of wear of the head. As a result, a decrease in circuit size as the equalizer, e.g., a decrease in the number of taps required to suppress the "error rate" to a predetermined value, can be enabled, thereby minimizing the "error rate" with a limited amount of hardware.

Furthermore, in the present invention, even if the head wears, the recording current can constantly be optimized i.e. within a range without degrading recording. Thus, a degradation in S/N ratio caused by wear of the head can be prevented, thus contributing to decrease in "error rate". As a result, the present invention has a remarkable effect in decreasing the price of a digital magnetic recording/reproducing apparatus, e.g., a digital VTR, and improving the recording/reproducing performance.

In addition, the present invention is based on the fact that the adjustment amount of the recording current depends on the wear state of the head. When the recording current is adjusted in the above manner, the adjustment amount is compared with the threshold value, and the comparison result is displayed by a predetermined means. Then, if the adjustment amount exceeds a certain threshold value, it can be informed to the operator that the gap of the head is close to a "depth end". Accordingly, the head can be used until immediately before the gap actually reaches the depth end. As a result, the service life of the head is substantially extended. In practice, since the head replacement time can be correctly informed to the operator in advance, preparation for the maintenance operation is facilitated.

Another Embodiment

Figure 8:
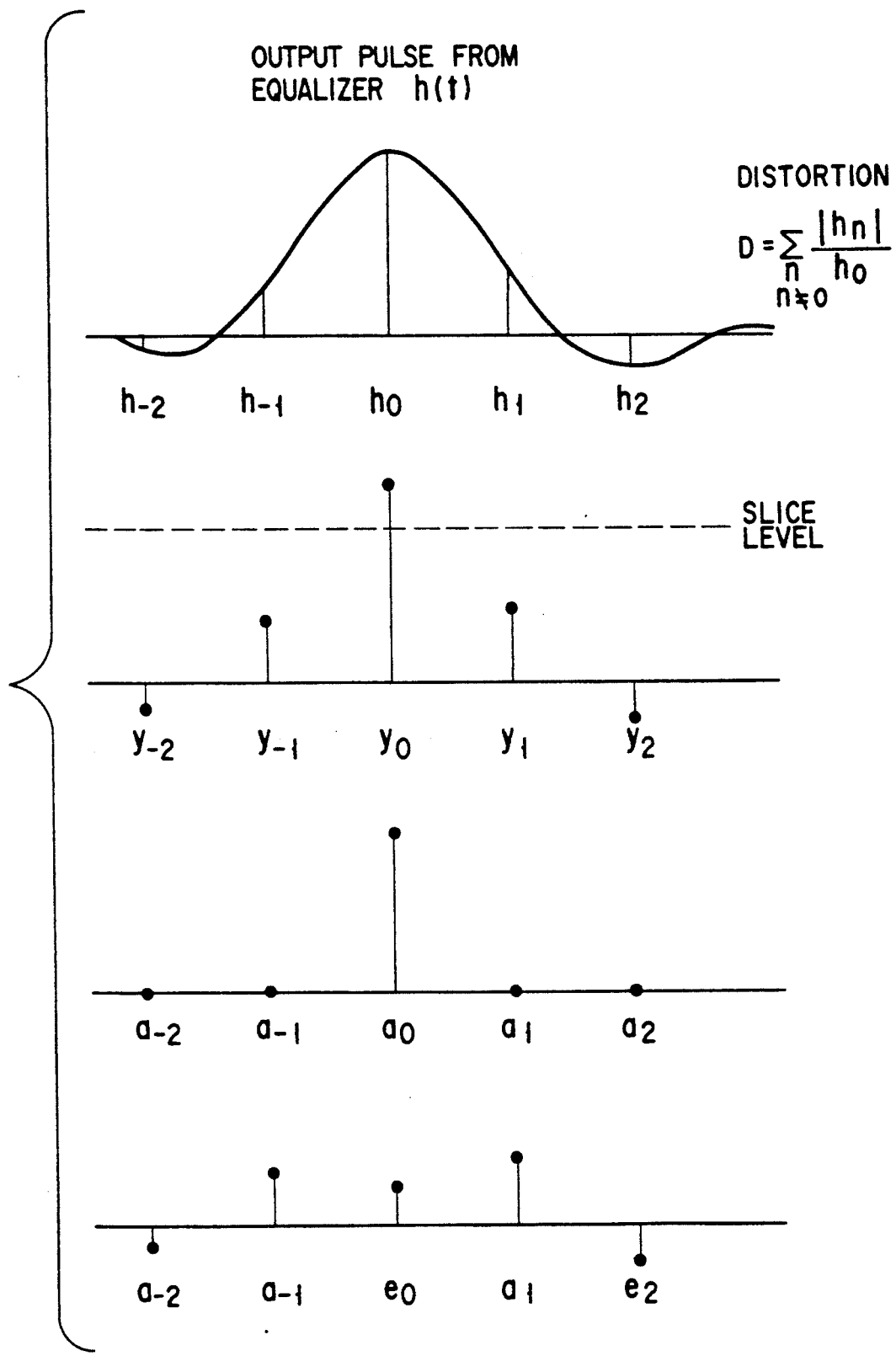
FIG. 8 is a set of graphs showing waveforms of the equalizer.

As shown in "Techniques for Adaptive Equation of Digital Communication Systems", R.W. Lucky, BSTJ, 45, 2, pp.255-286 (1966), a distortion (equalization error) in an output from an equalizer is defined by the following equation:

$$D = \sum_{\substack{n \\ n \neq 0}} \frac{|h_n|}{h_0} \quad (1)$$

where $h_n$ is a value obtained by sampling the impulse response waveform of the equalizer every bit period T (see FIG. 8).

The maximum likelihood estimates $\hat{n}_j$ of the equalization error are approximated by the following equation:

$$\hat{n}_j \approx \epsilon_j = \sum_{k=1}^{N} sgn(a_{k-j}) \cdot sgn(e_k) \quad (2)$$

where the suffix j in $\hat{n}_j$ and $\epsilon_j$ coincides with the number of taps obtained when the equalizer is constituted by a transversal filter having (2m+1) taps (that is, j = −m, −m+1, ..., 0, ..., m −1, m).

In the gain controller of the automatic equalizer, the gains of the respective taps are adjusted to minimize $|\epsilon_j|$ of equation (2).

In this embodiment, recording current adjustment is performed in the similar manner to this, which will be described below.

Figure 9:
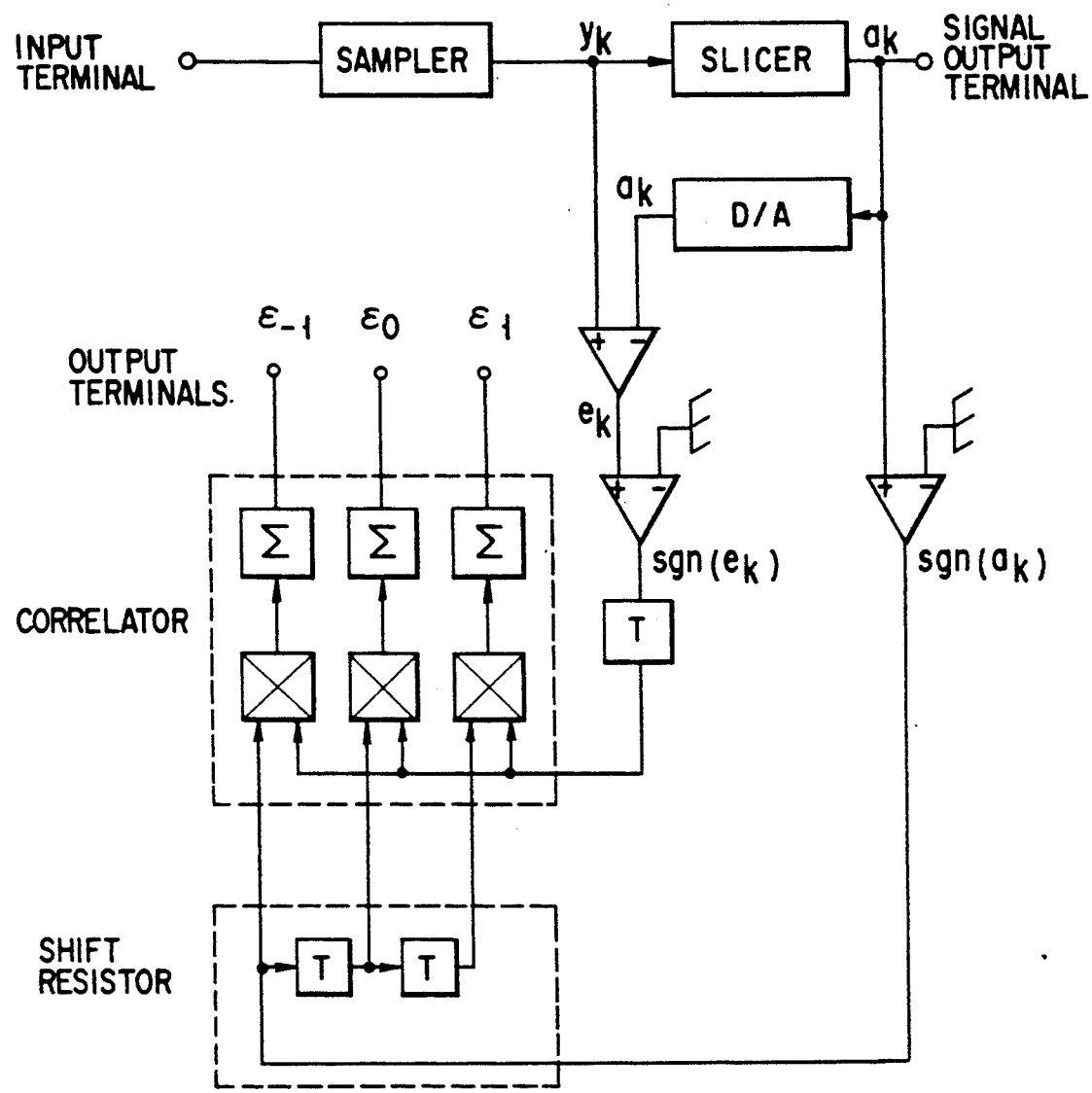
FIG. 9 is a block diagram showing an arrangement of a distortion detector.

FIG. 9 shows an arrangement of a distortion detector.

$\epsilon_j$ in equation (2) described above is an output from the correlator. The recording current is adjusted by the recording current adjusting circuit so as to minimize $\epsilon_j$ corresponding to the respective taps. Adjustment is performed sequentially from $\epsilon_j$ corresponding to the outer tap of the transversal filter so as to minimize $\epsilon_j$.

When the impulse response waveform of the equalizer is asymmetric about the vertical axis, evaluation may be performed from a larger one of $|\epsilon_j|$ and $|\epsilon_{-j}|$. In FIG. 9, j is set up to j=1. However, j can be 2 or more.

In summary, according to the present invention, the recording current is automatically adjusted to the optimum value in accordance with wear of the head so that the distortion and the S/N ratio of the reproduced signal are set close to the initial state as much as possible before the head is worn. Thus, a magnetic recording/reproducing apparatus capable of achieving a low error rate can be provided without complicating the equalize of the recording system.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic recording/reproducing apparatus comprising:
    a write head for recording an input signal on a magnetic recording medium;
    a recording amplifier, connected to said write head, for supplying a recording current corresponding to said input signal to said write head;
    a read head for reproducing said input signal recorded on said magnetic recording medium;
    a reproducing amplifier, connected to said read head, for generating a reproduced current corresponding to said input signal;
    an equalizer connected to said reproducing amplifier, for correcting a waveform of said input signal reproduced by said read head;
    distortion detecting means, connected to said equalizer, for detecting distortion of said input signal reproduced by said read head, thereby obtaining and outputting a distortion evaluation value; and
    recording current adjusting means, connected to said recording amplifier and to said distortion detecting means, for adjusting a magnitude of said recording current corresponding to said input signal in accordance with said evaluation value output by said distortion detecting means so as to decrease distortion present in said input signal, wherein said distortion detecting means comprises a sampler for periodically sampling said waveform of said input signal to form a sample value of said input signal reproduced by said read head;
    an encoder for converting said sample value of said input signal reproduced by said read head to a code signal;
    a D/A converter for converting said code signal output from said encoder to an analog signal;
    a subtractor for obtaining a difference between said analog signal and said sample value of said input signal reproduced by said read head and for outputting an error signal;
    a delay circuit for delaying said error signal by a predetermined period of time;
    a shift register for temporarily holding said code signal output from said encoder; and
    a correlator, connected to an input terminal of said recording current adjusting means, for calculating a mutual correlation between one input supplied thereto from said delay circuit and another input supplied thereto from said shift register, and wherein an output of said correlator is equal to a maximum likelihood estimation value of said distortion of said input signal reproduced by said read head centered about a certain reference voltage, represents an increase or a decrease of said distortion of said input signal reproduced by said read head, and is supplied to said recording current adjusting circuit.

2. A magnetic recording/reproducing apparatus comprising:

a write head for recording an input signal on a magnetic recording medium;

a recording amplifier, connected to said write head, for supplying a recording current corresponding to said input signal to said write head;

a read head for reproducing said input signal recorded on said magnetic recording medium;

a reproducing amplifier, connected to said read head, for generating a reproduced current corresponding to said input signal;

an equalizer, connected to said reproducing amplifier, for correcting a waveform of said input signal reproduced by said read head;

distortion detecting means, connected to said equalizer, for detecting distortion of said input signal reproduced by said read head, thereby obtaining and outputting a distortion evaluation value; and recording current adjusting means, connected to said recording amplifier and to said distortion detecting means, for adjusting a magnitude of said recording current corresponding to said input signal in accordance with said evaluation value output by said distortion detecting means so as to decrease distortion present in said input signal, wherein said equalizer is a fixed equalizer having fixed equalization characteristics to correct said waveform of said input signal reproduced by said read head to a normalized waveform.

* * * * *